United States Patent [19]
Lansberry et al.

[11] Patent Number: 5,627,758
[45] Date of Patent: May 6, 1997

[54] VECTOR CONTROL BOARD FOR AN ELECTRIC VEHICLE PROPULSION SYSTEM MOTOR CONTROLLER

[75] Inventors: Geoffrey B. Lansberry, Cambridge, Mass.; James L. Munro, Severna Park, Md.

[73] Assignee: Northrop Grumman Corporation, Los Angeles, Calif.

[21] Appl. No.: 258,306

[22] Filed: Jun. 10, 1994

[51] Int. Cl.$^6$ .................................................. G01R 17/08
[52] U.S. Cl. ........................ 364/481; 364/424.026; 318/254; 318/293; 318/599; 363/41; 363/98; 363/132; 388/811; 388/829; 388/907.2; 388/907.5
[58] Field of Search ........................ 364/481, 424.01, 364/424.02, 424.05, 424.1; 318/605, 568.24, 809, 823, 431–434, 437, 802, 803, 805, 807, 811, 254, 293, 599; 123/350–352, 355; 180/DIG. 3, 65.1, 535; 388/809, 811, 828, 829, 907.2, 907.5; 363/41, 98, 132

[56] References Cited

U.S. PATENT DOCUMENTS

| | | | |
|---|---|---|---|
| 5,038,090 | 8/1991 | Kawabata et al. | 318/809 |
| 5,038,092 | 8/1991 | Asano et al. | 318/809 |
| 5,168,202 | 12/1992 | Bradshaw et al. | 318/809 |
| 5,204,573 | 4/1993 | Bederson et al. | 310/198 |
| 5,268,628 | 12/1993 | Dong-II | 318/809 |
| 5,309,075 | 5/1994 | Yokoe et al. | 318/608 |
| 5,442,268 | 8/1995 | Goodarzi et al. | 318/432 |
| 5,475,293 | 12/1995 | Sakai et al. | 318/811 |

FOREIGN PATENT DOCUMENTS 2204969   11/1988   United Kingdom.

OTHER PUBLICATIONS

Tsutomu Ohmae, et al; "A Direct Digital Control System for an Electric Vehicle"; Power Electronics Conference; (1983–Tokyo); pp. 1736–1747.

B.K. Bose, et al; "A Microcomputer–Based Cintrol & Simulation of an Advanced Advanced IPM Synchronous Machine Drive System for EV Propulsion;" Nov. 1988.

*Primary Examiner*—Emanuel T. Voeltz
*Assistant Examiner*—Hal D. Wachsman
*Attorney, Agent, or Firm*—Philip A. Florenzo

[57] ABSTRACT

A vector control board for an electric vehicle propulsion system motor controller comprising a microcontroller for generating torque requests, a digital signal processor for receiving the torque requests from the microcontroller and for generating phase voltage signals in accordance with the torque requests, and a digital gate array for receiving the phase voltage signals from the digital signal processor and for generating gate drive signals from the phase voltage signals.

4 Claims, 10 Drawing Sheets

VECTOR CONTROL BOARD FOR AN ELECTRIC VEHICLE PROPULSION SYSTEM MOTOR CONTROLLER

RELATED APPLICATIONS

The following identified U.S. patent applications are filed on the same date as the instant application and are relied upon and incorporated by reference in this application.

U.S. patent application entitled "Flat Topping Concept" bearing attorney docket No. 58,295 (Ser. No. 08/258,295; Issued as U.S. Pat. No. 5,475,581), and filed on the same date herewith;

U.S. patent application entitled "Electric Induction Motor And Related Method Of Cooling" bearing attorney docket No. 58,332 (Ser. No. 08/442,708; now U.S. Pat. No. 5,519,269), and filed on the same date herewith;

U.S. patent application entitled "Automotive 12 Volt System For Electric Vehicles" bearing attorney docket No. 58,333 (Ser. No. 08/258,142; Pending), and filed on the same date herewith;

U.S. patent application entitled "Direct Cooled Switching Module For Electric Vehicle Propulsion System" bearing attorney docket No. 58,334 (Ser. No. 08/258,027; now U.S. Pat. No. 5,504,378), and filed on the same date herewith;

U.S. patent application entitled "Electric Vehicle Propulsion System" bearing attorney docket No. 58,335 (Ser. No. 08/258,307; Pending), and filed on the same date herewith;

U.S. patent application entitled "Digital Pulse Width Modulator With Integrated Test And Control" bearing attorney docket No. 58,338 (Ser. No. 08/258,305; now U.S. Pat. No. 5,506,484), and filed on the same date herewith;

U.S. patent application entitled "Control Mechanism For Electric Vehicle" bearing attorney docket No. 58,339 (U.S. Pat. No. 5,463,294; Issued), and filed on the same date herewith;

U.S. patent application entitled "Improved EMI Filter Topology for Power Inverters" bearing attorney docket No. 58,340 (Ser. No. 08/258,153; now U.S. Pat. No. 5,552,976), and filed on the same date herewith;

U.S. patent application entitled "Fault Detection Circuit For Sensing Leakage Currents Between Power Source And Chassis" bearing attorney docket No. 58,341 (Ser. No. 08/258,179; Issued as U.S. Pat. No. 5,481,194), and filed on the same date herewith;

U.S. patent application entitled "Electric Vehicle Relay Assembly" bearing attorney docket No. 58,342 (Ser. No. 08/258,117; now U.S. Pat. No. 5,567,991), and filed on the same date herewith;

U.S. patent application entitled "Three Phase Power Bridge Assembly" bearing attorney docket No. 58,343 (Ser. No. 08/258,033; U.S. Pat. No. 5,517,063), and filed on the same date herewith;

U.S. patent application entitled "Electric Vehicle Propulsion System Power Bridge With Built-In Test" bearing attorney docket No. 58,344 (Ser. No. 08/258,034; U.S. Pat. No. 5,569,966), and filed on the same date herewith;

U.S. patent application entitled "Method For Testing A Power Bridge For An Electric Vehicle Propulsion System" bearing attorney docket No. 58,345 (Ser. No. 08/258,178; U.S. Pat. No. 5,510,725), and filed on the same date herewith;

U.S. patent application entitled "Electric Vehicle Power Distribution Module" bearing attorney docket No. 58,346 (Ser. No. 08/258,157; U.S. Pat. No. 5,504,655), and filed on the same date herewith;

U.S. patent application entitled "Electric Vehicle Chassis Controller" bearing attorney docket No. 58,347 (Ser. No. 08/258,628; U.S. Pat. No. 5,508,594), and filed on the same date herewith;

U.S. patent application entitled "Electric Vehicle System Control Unit Housing" bearing attorney docket No. 58,348 (Ser. No. 08/258,156; Abandoned), and filed on the same date herewith;

U.S. patent application entitled "Low Cost Fluid Cooled Housing For Electric Vehicle System Control Unit" bearing attorney docket No. 58,349 (Ser. No. 08/258,299; Abandoned), and filed on the same date herewith;

U.S. patent application entitled "Electric Vehicle Coolant Pump Assembly" bearing attorney docket No. 58,350 (Ser. No. 08/258,296; now U.S. Pat. No. 5,529,114), and filed on the same date herewith;

U.S. patent application entitled "Heat Dissipating Transformer Coil" bearing attorney docket No. 58,351 (Ser. No. 08/258,141; Issued as U.S. Pat. No. 5,469,124), and filed on the same date herewith;

U.S. patent application entitled "Electric Vehicle Battery Charger" bearing attorney docket No. 58,352 (Ser. No. 08/258,154; Pending), and filed on the same date herewith.

BACKGROUND OF THE INVENTION

1. Field of the Invention

The present invention relates to a vector control board. More particularly, the present invention relates to a vector control board for an electric vehicle propulsion system motor controller. While the invention is subject to a wide range of applications, it is especially suited for use in electric vehicles that utilize batteries or a combination of batteries and other sources, e.g., a heat engine coupled to an alternator, as a source of power, and will be particularly described in that connection.

2. Description of the Related Art

For an electric vehicle to be commercially viable, its cost and performance should be competitive with that of its gasoline-powered counterparts. Typically, the vehicle's propulsion system and battery are the main factors which contribute to the vehicle's cost and performance competitiveness.

Generally, to achieve commercial acceptance, an electric vehicle propulsion system should provide the following features: (1) vehicle performance equivalent to typical gasoline-powered propulsion systems; (2) smooth control of vehicle propulsion; (3) regenerative braking; (4) high efficiency; (5) low cost; (6) self-cooling; (7) electromagnetic interference (EMI) containment; (8) fault detection and self-protection; (9) self-test and diagnostics capability; (10) control and status interfaces with external systems; (11) safe operation and maintenance; (12) flexible battery charging capability; and (13) auxiliary 12 volt power from the main battery. In prior practice, however, electric vehicle propulsion system design consisted largely of matching a motor and controller with a set of vehicle performance goals, such that performance was often sacrificed to permit a practical motor and controller design. Further, little attention was given to the foregoing features that enhance commercial acceptance.

For example, a typical conventional electric vehicle propulsion system consisted of a DC motor, a chopper-type motor controller, an independent battery charger, and a distributed set of controls and status indicators. Vehicle performance was generally inadequate for highway driving, acceleration was uneven, and manual gear-changes were required. In addition, regenerative braking was either not available or, at best, available only at high motor speeds. Also, each of the system components had its own cooling system that used forced air or a combination of forced air and liquid cooling. Moreover, the issues of volume production cost, EMI, fault detection, maintenance, control and status interfaces, and safety were generally not addressed in a comprehensive manner.

SUMMARY OF THE INVENTION

Accordingly, the present invention is directed to a vector control board for an electric vehicle propulsion system motor controller that substantially obviates one or more of the problems due to the limitations and disadvantages of the related art.

Features and advantages of the invention will be set forth in the description which follows, and in part will be apparent from the description, or may be learned by practice of the invention. The objectives and other advantages of the invention will be realized and attained by the method and apparatus particularly pointed out in the written description and claims thereof as well as the appended drawings.

To achieve these and other advantages and in accordance with the purpose of the invention, as embodied and broadly described, the invention provides for a vector control board for an electric vehicle propulsion system motor controller comprising a microcontroller for generating torque requests, a digital signal processor for receiving the torque requests from the microcontroller and for generating phase voltage signals in accordance with the torque requests, and a digital gate array for receiving the phase voltage signals from the digital signal processor and for generating gate drive signals from the phase voltage signals.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate a presently preferred embodiment of the invention and, together with the description, serve to explain the principles of the invention. In the drawings.

DESCRIPTION OF THE PREFERRED EMBODIMENT

Reference will now be made in detail to a present preferred embodiment of the invention, an example of which is illustrated in the accompanying drawings.

Figure 1:
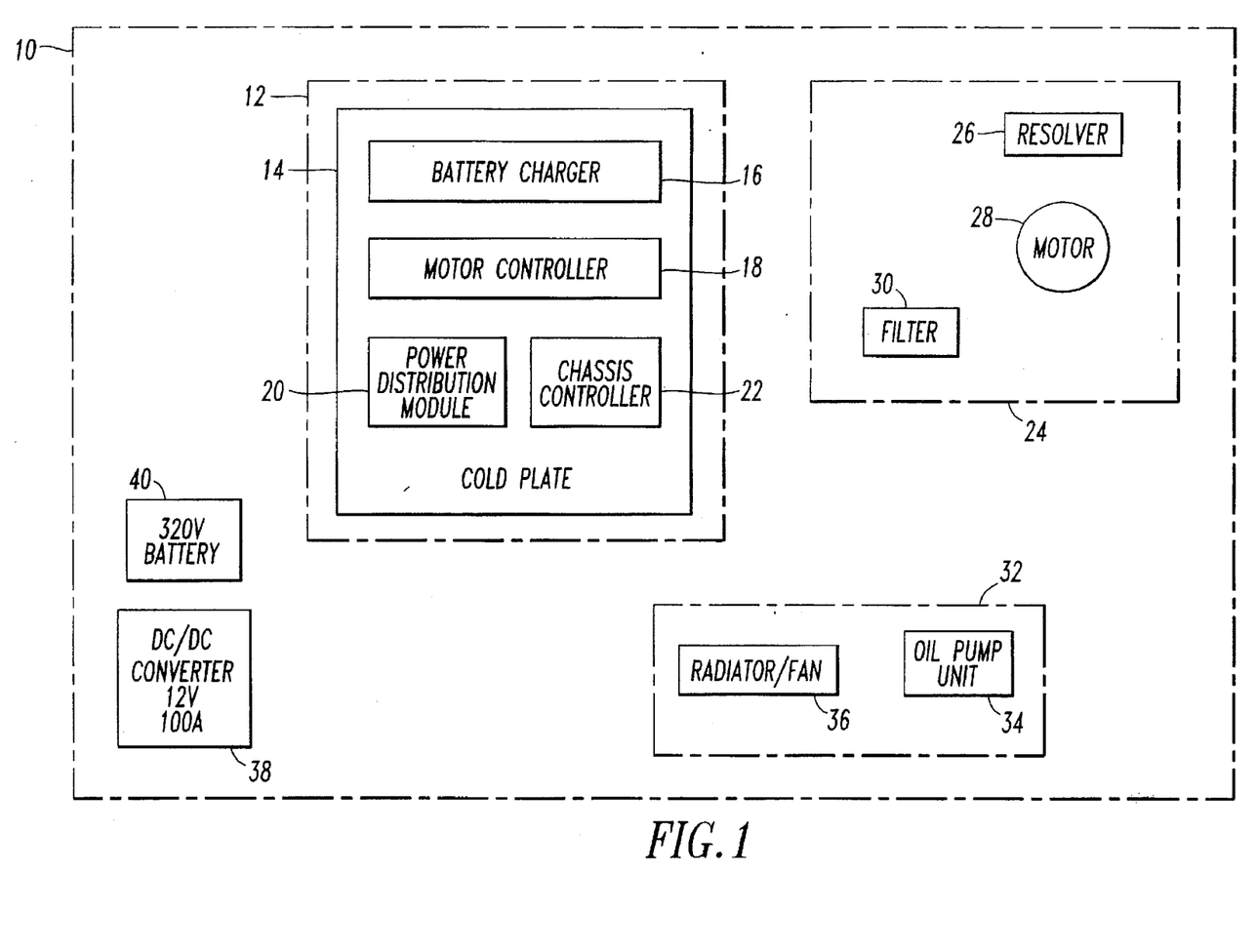
FIG. 1 is a block diagram of an electric vehicle propulsion system in accordance with a preferred embodiment of the invention.

As shown in FIG. 1, there is provided an electric vehicle propulsion system 10 comprising a system control unit 12, a motor assembly 24, a cooling system 32, a battery 40, and a DC/DC converter 38. The system control unit 12 includes a cold plate 14, a battery charger 16, a motor controller 18, a power distribution module 20, and a chassis controller 22. The motor assembly 24 includes a resolver 26, a motor 28, and a filter 30. The cooling system 32 includes an oil pump unit 34 and a radiator/fan 36.

Figure 2:
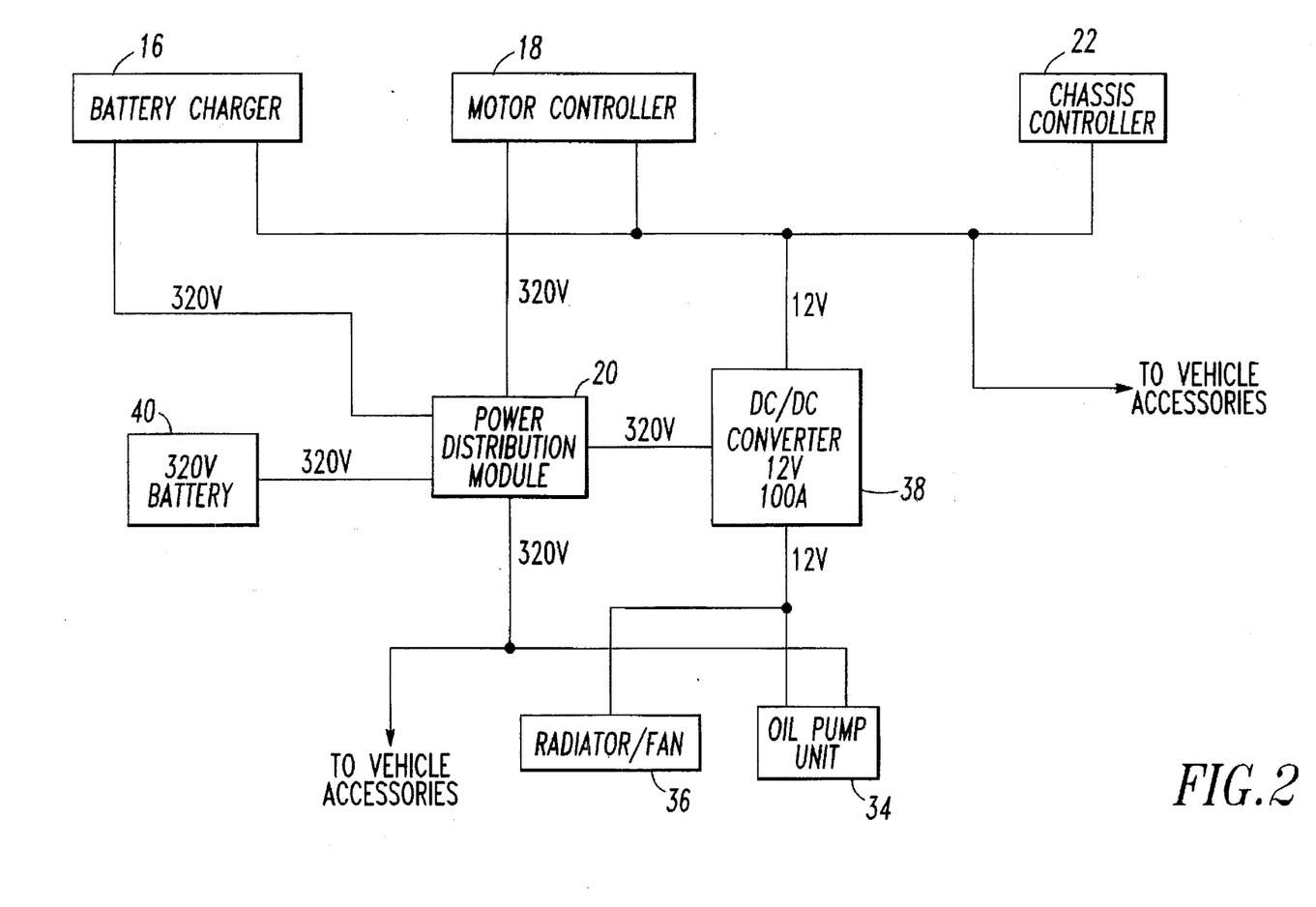
FIG. 2 is a power distribution diagram of the electric vehicle propulsion system of FIG. 1.

As shown in FIG. 2, the battery 40 serves as the primary source of power for the electric propulsion system 10. The battery 40 comprises, for example, a sealed lead acid battery, a monopolar lithium metal sulfide battery, a bipolar lithium metal sulfide battery, or the like, for providing a 320 volt output. Preferably, the electric propulsion system 10 works over a wide voltage range, e.g., 120 volts to 400 volts, to accommodate changes in the output voltage of the battery 40 due to load or depth of discharge. However, the electric vehicle propulsion system 10 is preferably optimized for nominal battery voltages of about 320 volts.

The power distribution module 20 is coupled to the output of the battery 40 and includes, among other things, fuses, wiring, and connectors for distributing the 320 volt output from the battery 40 to various components of the electric vehicle propulsion system 10. For example, the power distribution module 20 distributes the 320 volt output from the battery 40 to the motor controller 18, the DC/DC converter 38, the oil pump unit 34, and the battery charger 16. The power distribution module 20 also distributes the 320 volt output from the battery 40 to various vehicle accessories, which are external to the electric vehicle propulsion system 10. These vehicle accessories include, for example, an air conditioning system, a heating system, a power steering system, and any other accessories that may require a 320 volt power supply.

The DC/DC converter 38, which, as described above, is coupled to the 320 volt output of the power distribution module 20, converts the 320 volt output of the power distribution module 20 to 12 volts. The DC/DC converter 38 then supplies its 12 volt output as operating power to the battery charger 16, the motor controller 18, the chassis controller 22, the oil pump 34, and the radiator/fan 36. The DC/DC converter 38 also supplies its 12 volt output as operating power to various vehicle accessories, which are external to the electric vehicle propulsion system 10. These vehicle accessories include, for example, vehicle lighting, an audio system, and any other accessories that may require a 12 volt power supply. It should be appreciated that the DC/DC converter 38 eliminates the need for a separate 12 volt storage battery.

Figure 6A:
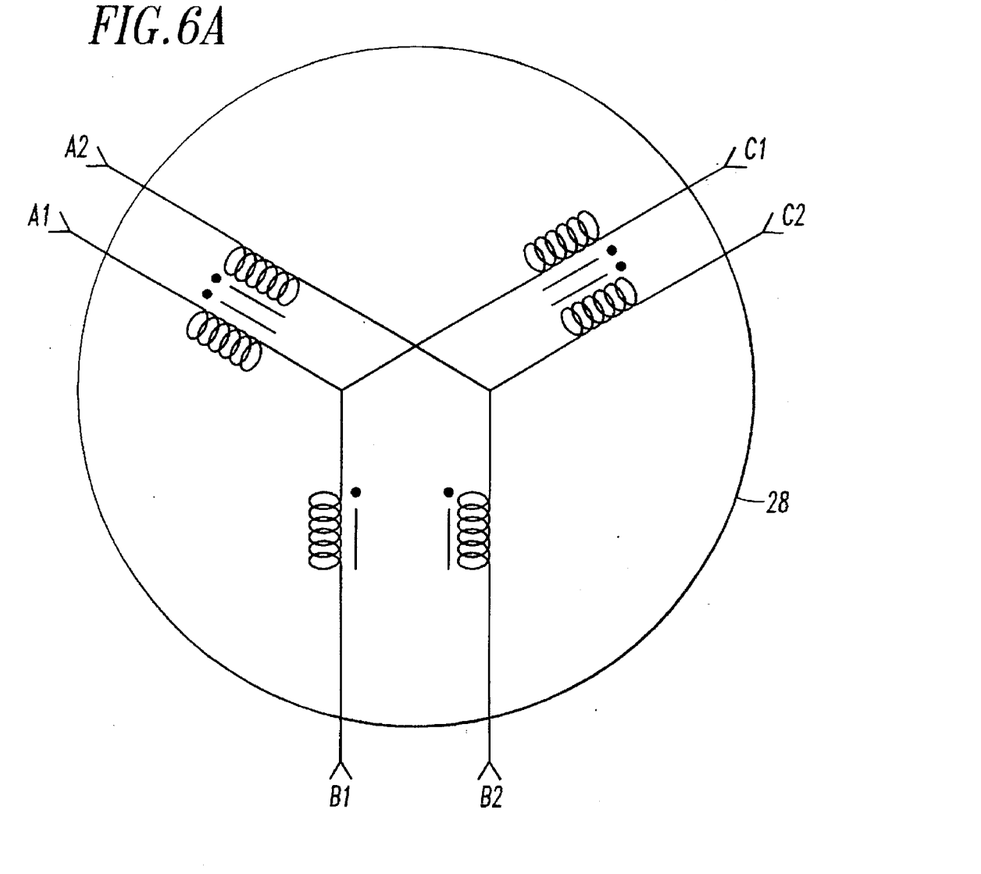
FIG. 6A is a schematic diagram of the motor of the electric vehicle propulsion system of FIG. 1.

As shown in FIG. 6A, the motor 28 is a 3-phase AC induction motor having two identical, electrically isolated, windings per phase (windings A1 and A2 are for the "A" phase, windings B1 and B2 are for the "B" phase, and windings C1 and C2 are for the "C" phase) for producing high torque at zero speed to provide performance comparable to conventional gas-driven engines. The shaft (not shown) of the motor 28 is coupled to the vehicle transaxle (not shown). Preferably, the two windings in each phase of the motor 28 are aligned substantially on top of one another and are electrically in phase such that each winding provides approximately half the total power of the phase. Also the motor 28 is preferably completely sealed and utilizes spray-oil cooling to remove heat directly from the rotor and end windings to increase reliability.

Operation of the electric vehicle propulsion system 10 will now be described with reference to FIGS. 3–5 and 7–10.

Figure 3:
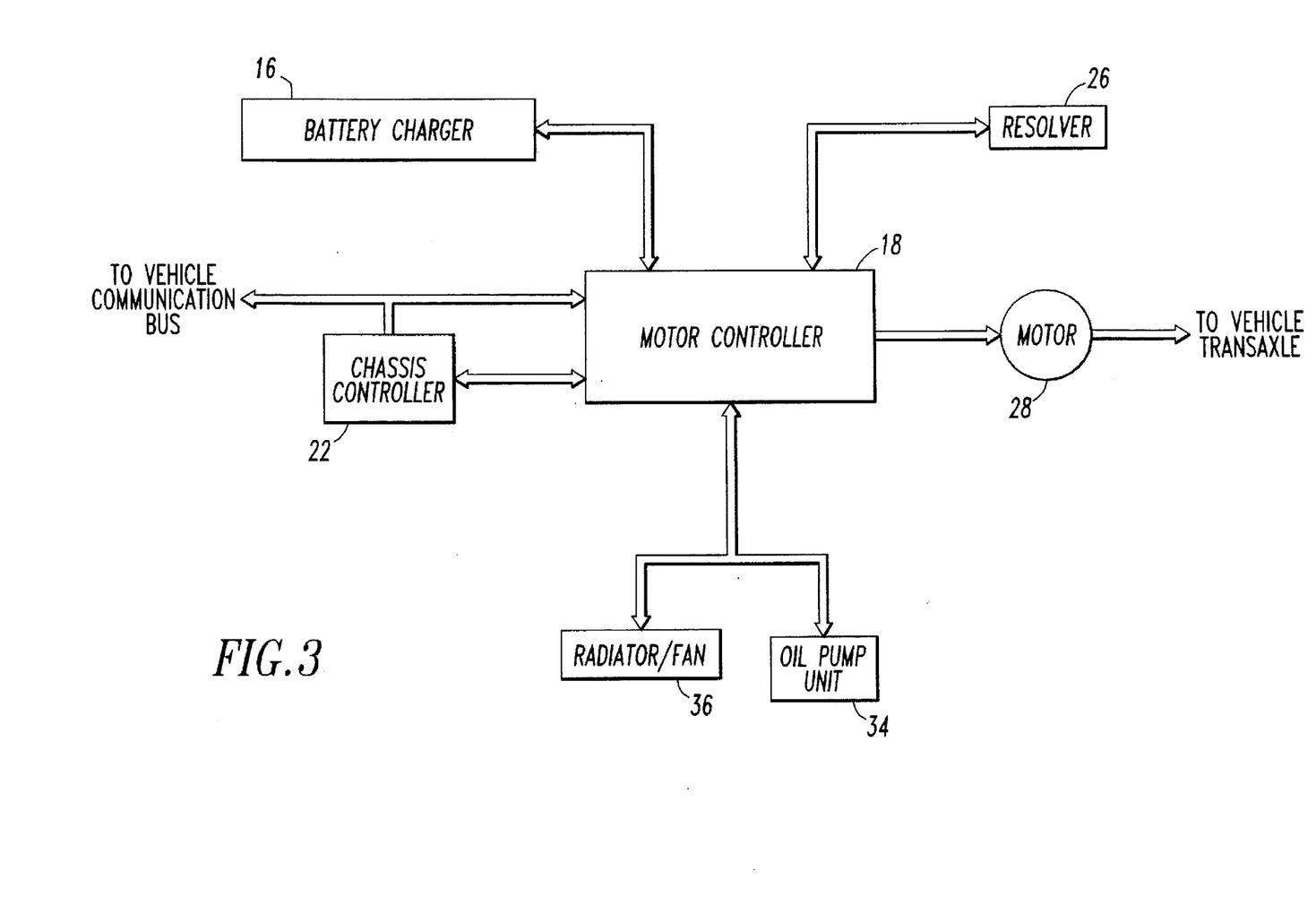
FIG. 3 is a functional diagram of the electric vehicle propulsion system of FIG. 1.
Figure 4:
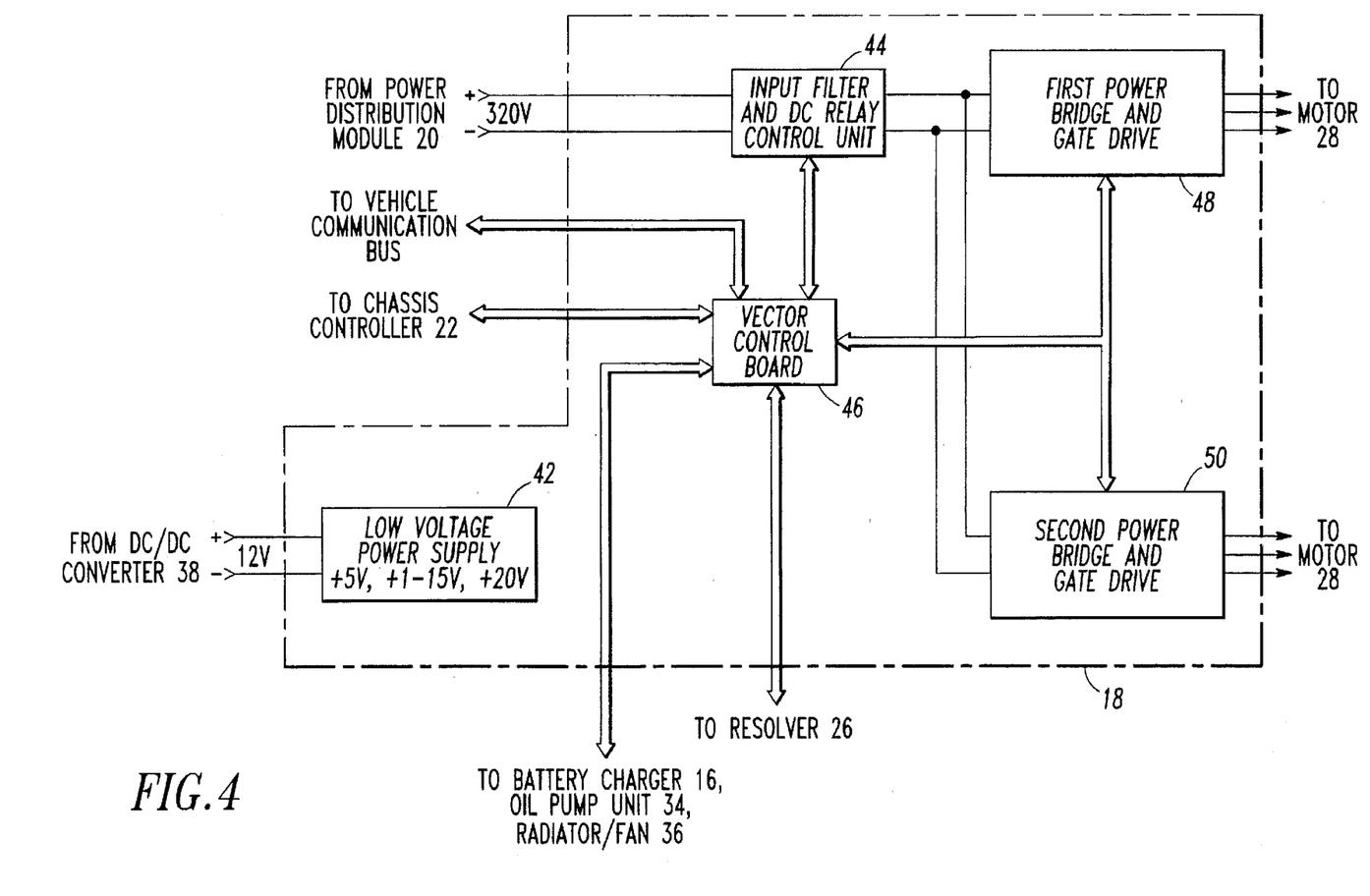
FIG. 4 is a functional diagram of the motor controller of the electric vehicle propulsion system of FIG. 1.

As shown in FIGS. 3 and 4, the components of the electric vehicle propulsion system 10 are interconnected via various data busses. The data busses can be of the electrical, optical, or electro-optical type as is known in the art.

The battery charger 16 receives command signals from and sends status signals to the motor controller 18 for charging the battery 40. The battery charger 16 provides a controlled battery charging current from an external AC power source (not shown). Preferably, AC current is drawn from the external source at near-unity power factor and low harmonic distortion in compliance with expected future power quality standards. Further, the battery charger 16 is preferably designed to be compatible with standard ground fault current interrupters and single-phase power normally found at residential locations.

Figure 5:
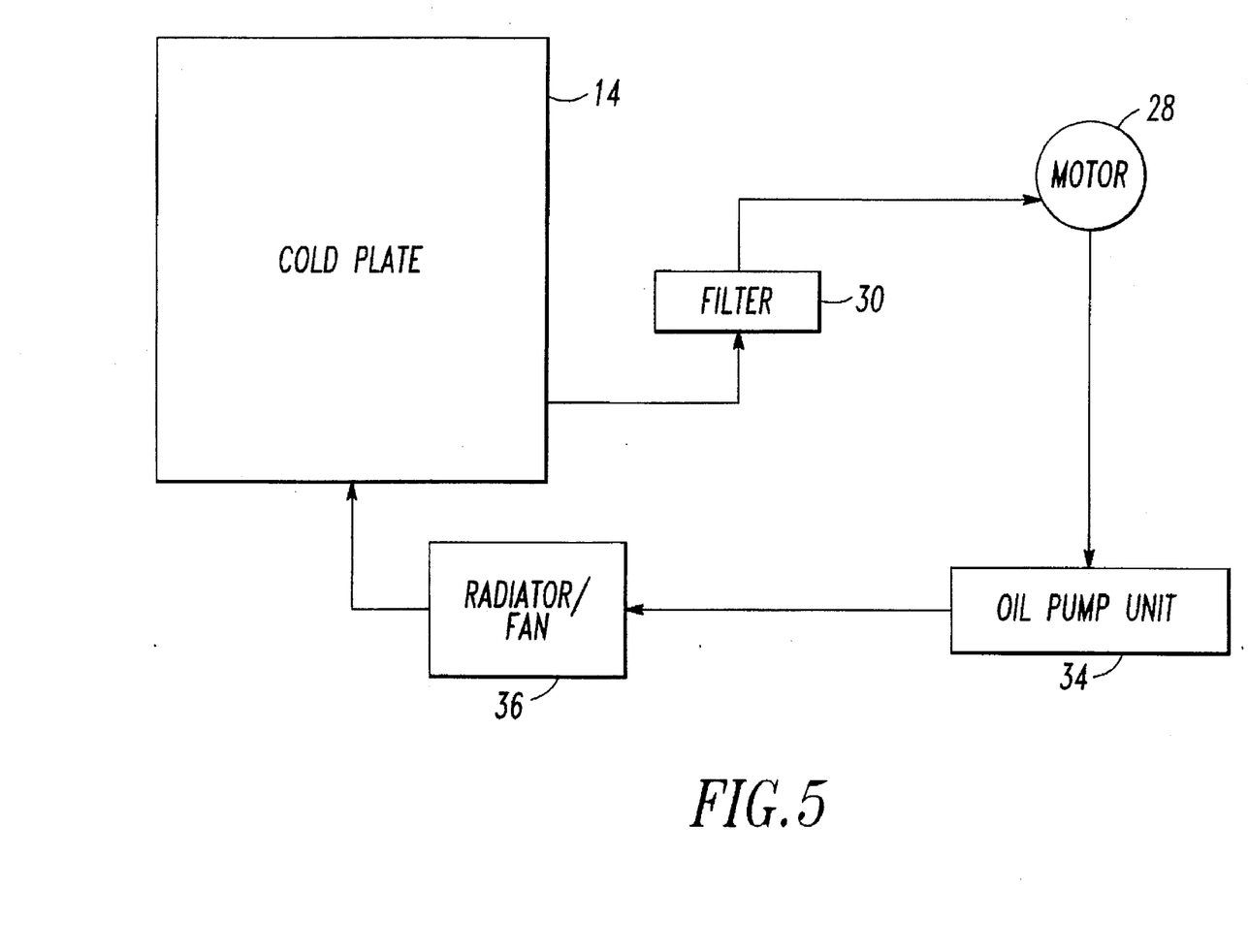
FIG. 5 is a cooling diagram of the electric vehicle propulsion system of FIG. 1.

The oil pump unit 34 and radiator/fan 36 also receive command signals from and send status signals to the motor controller 18. As shown in FIG. 5, the electric vehicle propulsion system 10 utilizes a closed loop cooling system including the cold plate 14, the filter 30, the motor 28, the oil pump unit 34, and the radiator/fan 36. Preferably, the cold plate 14 is a hollow body having a double-sided surface on which the battery charger 16, the motor controller 18, and the power distribution module 20 are mounted in thermal contact. It is contemplated that the DC/DC converter 38 can also be mounted in thermal contact with the cold plate 14. The oil pump unit 34 circulates oil, e.g., aircraft turbine oil, from the oil reservoir of the motor 28 through the radiator/fan 36, the cold plate 14, the filter 30, and back through the motor 28 as shown in FIG. 5. Heat is removed from the oil by the radiator/fan 36 and the oil is filtered by the filter 30, which can comprise a commercially available oil filter known in the art. Preferably, the oil pump unit 34 is controlled by the motor controller 18 to provide a variable rate of oil flow. It should be appreciated that the closed loop oil cooling system of FIG. 5 protects the electric vehicle propulsion system 10 from the harsh automotive operating environment, thus increasing reliability and reducing maintenance. Further, because the same oil used for lubricating the motor 28 is also used for cooling of the system control unit 12, the cooling system can have a simplified design.

Figure 6B:
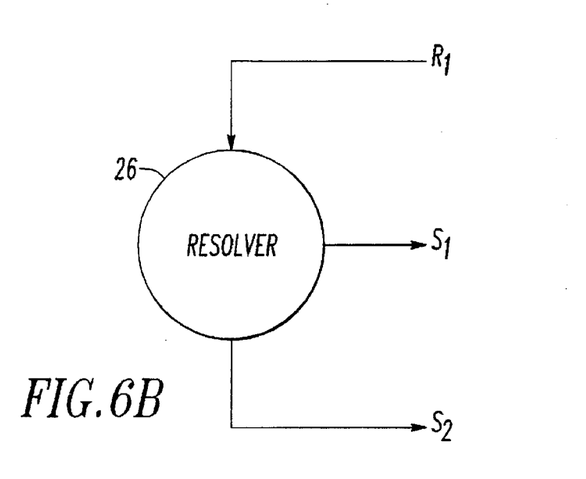
FIG. 6B is a schematic diagram of the resolver of the electric vehicle propulsion system of FIG. 1.

The resolver 26 is illustrated in FIG. 6B and is positioned proximate to the motor 28 for detecting the angular position of the motor shaft and for providing signals indicative of the angular position of the motor shaft to the motor controller 18. The reference signal line $R_1$ connected to the resolver is for a positive or negative reference value indicating the angular position of the motor shaft. The $S_1$ signal line from the resolver provides a positive or negative sine value for the angular position of the motor shaft and the $S_2$ signal line from the resolver provides a positive or negative cosine value for the angular position of the motor shaft.

The resolver 26 can comprise a commercially available resolver or other resolver known in the art. As explained in more detail below, reference signals for the resolver 26 are provided by the motor controller 18.

The chassis controller 22 and the motor controller 18 receive signals from a vehicle communication bus. Generally, the vehicle communication bus serves as a communication pathway for interfacing various vehicle sensors and controllers to the chassis controller 22 and the motor controller 18, as will be explained in more detail below.

The chassis controller 22 comprises a microprocessor-based digital and analog electronics system and provides control and status interfacing to the vehicle's sensors and controllers and to the motor controller 18. For example, the chassis controller 22 is connected, via the vehicle communication bus, to the vehicle key switch, accelerator, brake, and drive selector switches. The chassis controller 22 interprets signals from these switches to provide the motor controller 18 with start-up, drive mode (e.g., forward, reverse, and neutral), motor torque, regenerative braking, shutdown, and built-in test (BIT) commands. Preferably, the chassis controller 22 communicates with the motor controller 18 via an opto-coupled serial data interface and receives status signals from the motor controller 18 of all the commands sent to verify the communication links between the chassis controller 22, the vehicle, and the motor controller 18 and to verify that the vehicle is operating properly. It should be appreciated that because the chassis controller 22 provides the control and status interfacing to the vehicle's sensors and controllers and to the motor controller 18, the electric vehicle propulsion system 10 can be modified for use with any number of different vehicles simply by modifying the chassis controller 22 for a particular vehicle.

The chassis controller 22 also provides battery management capabilities by using signals received over the vehicle communication bus from a battery current sensor located in the power distribution module 20. The chassis controller 22 interprets signals from the battery current sensor, provides charging commands to the motor controller 18, and sends a state-of-charge value to a "fuel" gauge on the vehicle dashboard. The chassis controller 22 further connects, via the vehicle communication bus, to vehicle controllers including odometer, speedometer, lighting, diagnostic and emissions controllers, as well as to an RS-232 interface for system development.

As shown in FIG. 4, the motor controller 18 includes a low voltage power supply 42, an input filter and DC relay control unit 44, a vector control board 46, and first and second power bridges and gate drives 48 and 50, respectively.

The low voltage power supply 42 converts the 12 volt output from the DC/DC converter 38 to provide +5 V, +/−15 V, and +20 V outputs to the input filter and DC relay control unit 44, the vector control board 46, the first power bridge 48, and the second power bridge 50. The low voltage power supply 42 can comprise a commercially available power supply as is known in the art.

The input filter and DC relay control unit 44 includes electrical connections for coupling the 320 volt output of the power distribution module 20 to the first and second power bridges 48 and 50, respectively. The input filter and DC relay control unit 44 includes EMI filtering, a relay circuit for disconnecting the coupling of the 320 volt output of the power distribution module 20 to the first and second power bridges 48 and 50, respectively, and various BIT circuits including voltage sense circuits and a chassis ground fault circuit. Preferably, the input filter and DC relay control unit 44 receives control signals from and sends status signals, e.g., BIT signals, to the vector control board 46.

Figure 7:
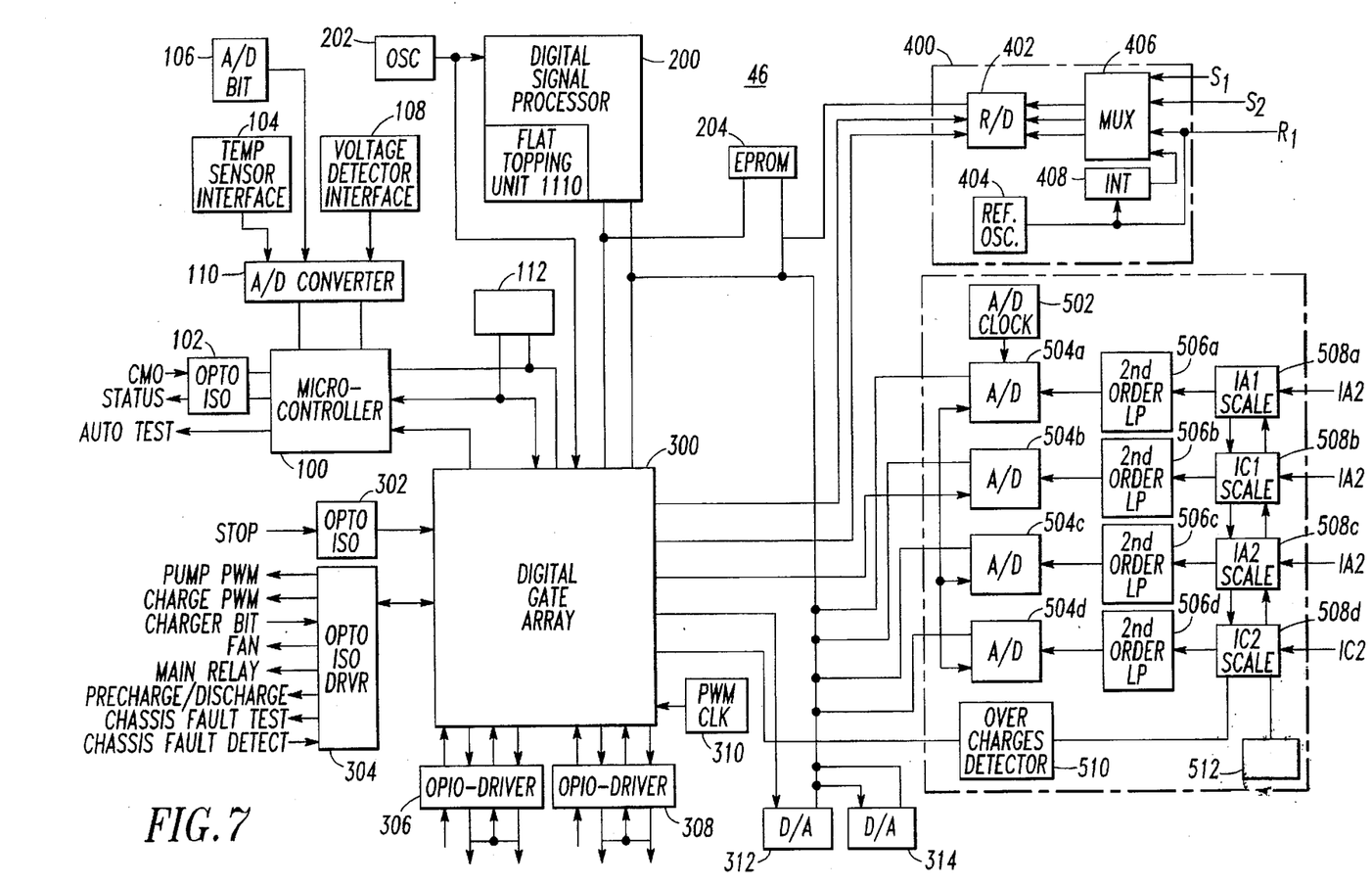
FIG. 7 is a schematic diagram of the vector control board of the motor controller of FIG. 4.

As shown in FIG. 7, the vector control board 46 comprises a microcontroller 100, a digital signal processor 200, a digital gate array 300, a resolver interface 400, and an analog interface 500. Clock signals for the microcontroller 100, the digital signal processor 200, and the digital gate array 300 are provided by an oscillator 202.

The resolver interface 400 includes an R/D converter 402, a reference oscillator 404, a multiplexor 406, and a BIT circuit 408. The resolver interface 400 receives via the multiplexor 406 rotor position measurements in the form of signals S1 and S2. The R/D converter 402 then converts the signals S1 and S2 to digital values. As explained above, the signals S1 and S2 are produced by the resolver 26 and are indicative of the angular position of the shaft of the motor 28. The resolver interface 400 also provides reference signals to the resolver 26. In particular, the reference oscillator 404 produces reference waveforms which are supplied to the resolver 26 as signal R1 via the multiplexor 406. The BIT circuit 408 performs BIT operations to test the operation of the resolver interface 400.

The analog interface 500 includes an A/D clock, a plurality of A/D converters 504a–d, a plurality of antialiasing filters 506a–d, a plurality of current scalers 508a–d, an over current detector 510, and a BIT circuit 512. The analog interface 500 receives and processes current measurements in the form of signals IA1, IC1, IA2, and IC2 from current sensors (not shown) located at the first and second power bridges 48 and 50, respectively. The current sensors are preferably coupled to the windings A1, A2, C1, and C2 of the motor 28. The signals IA1, IC1, IA2, and IC2 are received and scaled by the current scalers 508a–d, filtered by the antialiasing filters 506a–d, and then converted to digital values by the A/D converters 504a–d. The overcurrent detector 510 detects overcurrents in the current scalers 508a–d and the BIT circuit 512 performs BIT operations to test the operation of the analog interface 500.

The microcontroller 100 comprises, for example, a microcontroller selected from the Motorolla 68HC11 family of microcontrollers or other similar device known in the art. As its main function, the microcontroller 100 performs various housekeeping functions of the vector control board 46. For example, the microcontroller 100 communicates with the chassis controller 22 by receiving current commands, BIT commands, torque commands, and mode commands from and sending status signals to the chassis controller 22 via an opto-isolator 102. The microcontroller 100 also communicates with the digital signal processor 200 by providing the digital signal processor 200 with torque requests via the digital gate array 300, and communicates with the digital gate array 300 to perform, for example, various BIT and control operations. Preferably, the microcontroller 100 includes a combination of RAM, ROM, and EEPROM for storing program instructions for controlling its operation. Alternatively, some or all of the program instructions can be stored in an EPROM 112.

The microcontroller 100 also receives analog input signals from a temperature sensor interface 104, an A/D BIT circuit 106, and a voltage detector interface 108 via an A/D converter 110. The A/D converter 110 is preferably part of the microcontroller 100.

The analog input signals from the temperature sensor interface 104 include temperature signals transmitted by temperature sensors (not shown) located on the cold plate 14 in proximity to the first and second power bridges 48 and 50, respectively. The analog input signals from the A/D BIT circuit 106 include voltage test signals for testing the A/D converter 110. The analog input signals from the voltage detector interface 108 include voltage signals transmitted by voltage detectors (not shown) located in the input filter and DC relay control unit 44.

The digital signal processor 200 comprises, for example, a Texas Instrument TMS320C50 digital signal processor or other similar device known in the art. As its main function, the digital signal processor 200 implements a torque control program stored in an EPROM 204 and down loaded to RAM located in the digital signal processor 200 upon start up of the electric vehicle propulsion system 10. Alternatively, the digital signal processor 200 may be preprogrammed to include the torque control program.

In particular, the digital signal processor 200 receives the digitized rotor position measurements from the resolver interface 400, the digitized current measurements from the analog interface 500, and torque commands from the microcontroller 100 and uses these measurements and commands to generate phase voltage signals. As will be explained in more detail below, these phase voltage signals are supplied to the digital gate array 300, whereby the digital gate array 300 produces pulse width modulated (PWM) voltage waveforms in the form of gate drive signals to produce desired acceleration or braking effects in the motor 28. The phase voltage signals, and thus the PWM voltage waveforms, are generated in accordance with the torque control program which is designed to result in a requested torque output. Implementation of the torque control program by the digital signal processor 200 will now be described with reference to FIGS. 8 and 9.

As shown in FIG. 7, the microcontroller 100 sends a torque request to the digital signal processor 200 through the digital gate array 300. The torque request corresponds to the torque command from the chassis controller 22 to the microcontroller 100. However, the amount of torque sent from the chassis controller 22 may not match the torque request to the DSP 200 because torque amount is subject to present conditions such as current temperature, battery supply availability and current speed, for example. These conditions are sensed by the microcontroller 100 and sends a torque request to the DSP incorporating the conditions.

Figure 8:
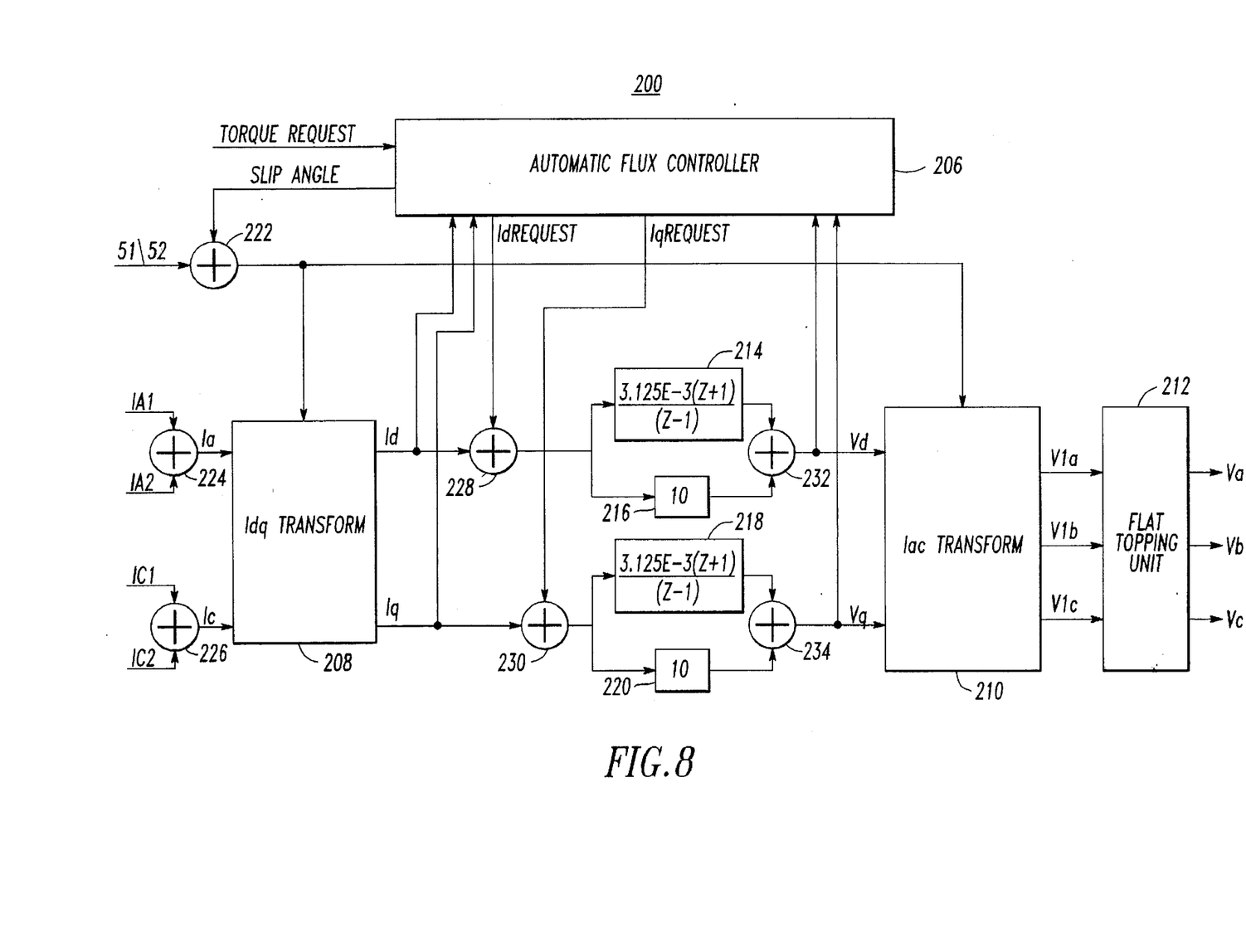
FIG. 8 is a functional diagram of the digital signal processor of the vector control board of FIG. 7.

The DSP 200 receives information on the amount of current in the motor through the analog interface 500 (FIG. 7), which samples the current using the A/D converters 504a, 504b, 504c and 504d. The current from phases A and C are required only. As shown in FIG. 8, currents, IA1 and IA2 from phase A are added by an adder 224 to produce Ia and currents IC1 and IC2 from phase C are added by an adder 226 to produce Ic. An Idq Transform 208 converts Ia and Ic to a direct component Id and quadrature component Iq, which represent Cartesian coordinates of the stator current demand vector signal in a synchronously rotating reference frame (see U.S. Pat. No. 5,168,204 for a detailed explanation).

Figure 9:
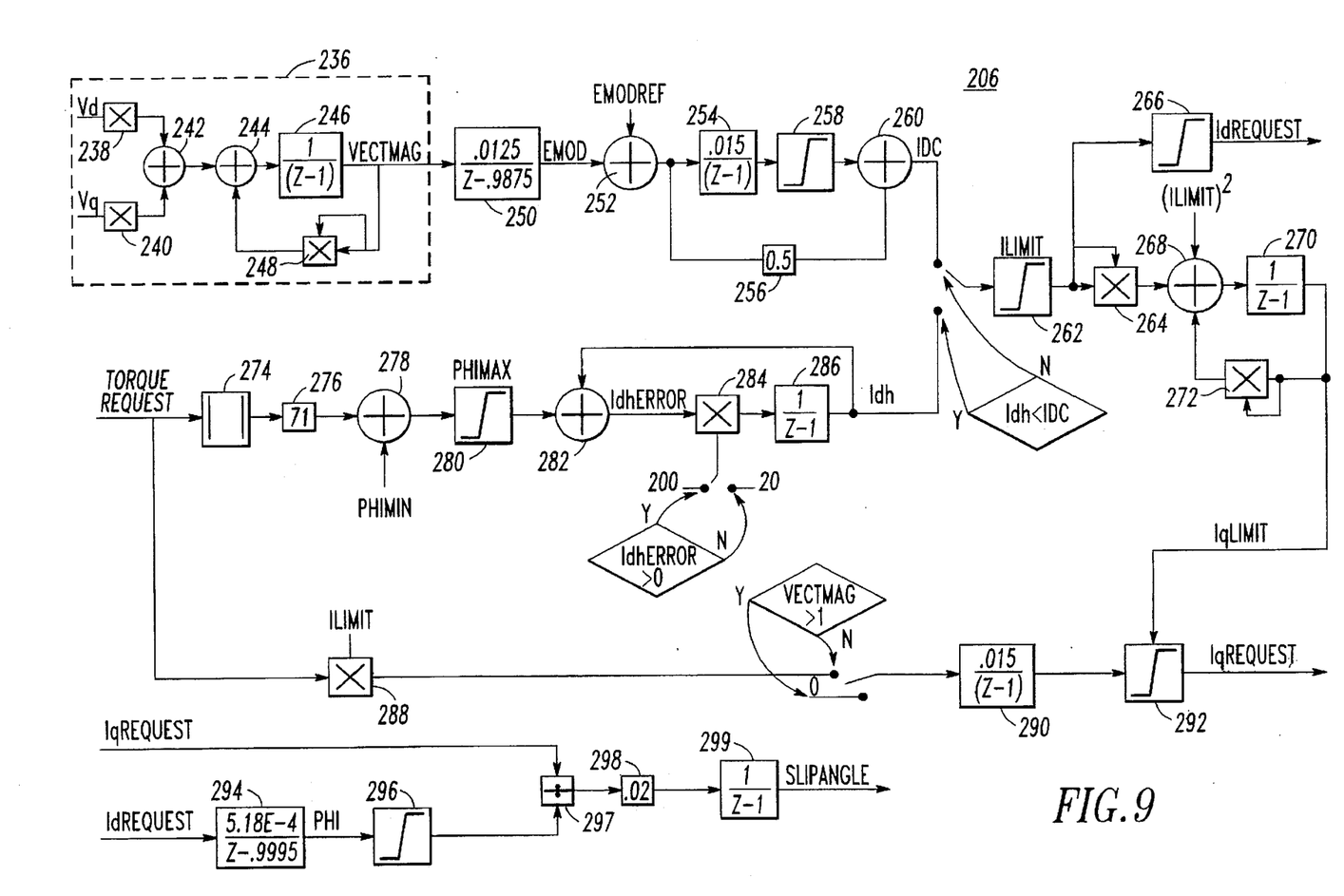
FIG. 9 is a functional diagram of the automatic flux controller of the digital signal process of FIG. 8.

The DSP 100 performs an algorithm according to the torque request using an automatic flux controller (AFC) 206 within the DSP 100. The functions of an automatic flux controller is explained in U.S. Pat. No. 5,168,204 to Schauder, the content of which is incorporated by reference. As shown in FIG. 9, the AFC 206 receives the torque request and generates IdRequest (field component) and IqRequest (torque component), which contain the proper amount of torque and field. The field component is based on the fields on the rotor and stator which opposed each other to create the torque. If maximum voltage is being applied and additional torque is requested (usually this occurs at higher speeds), then the field on the rotor is decreased to allow faster speed. Thus, if the current voltage being used is high, then the rotor can be controlled (field weakening control) to be reduced to provide higher vehicle speed. However, in this field weakening method, torque and acceleration is lower (since more power is needed to accelerate at higher speeds than at lower speeds).

The voltage currently being applied, Emod, is subtracted from the maximum voltage available EmodRef by subtractor 254. Emod is obtained from voltage vectors Vd and Vq. The voltage vectors Vd and Vq are obtained from Id and Iq from the Idq transform 208 through transform functions 214 and 218. The vector magnitude (VectMag) of Vd and Vq is determined from unit 236. The vector magnitude goes through a filter 250 to produce the voltage Emod. The subtracted result goes through a proportional plu integral process (254, 256, 258, and 260) to control IDC to achieve and increased speed. This process is called a high speed torque control as opposed to a low speed torque process which is used when sufficient voltage is remaining (usually at low speeds) to accelerate the vehicle with maximum torque. The low speed torque process is shown with labels 274, 276, 278, 280, 282, 284 and 286. This process outputs the torque available at present conditions (Idh).

Idh and IDC is compared and if IDC is less than Idh, i.e., there is not enough voltage remaining, then field weakening method is used to increase the speed. However, if IDC is greater than Idh, i.e., there is enough voltage remaining, then field is not changed and higher torque and acceleration is possible. Both methods output corresponding IdRequest (field component) and limit IqRequest (torque component) through 262, 264, 268, 270, 272, 292. IdRequest and IqRequest are then used to generate an appropriate SlipAngle, which is output from the automatic flux controller 206.

The SlipAngle plus rotor position (222), Vd and Vq are input to an Iac Transform 210 to convert back to the original coordinate system. The iac Transform 210 outputs corresponding voltage reference signals V1a, V1b and V1c corresponding to the torque request to a flat-topping unit 212 to increase the signal amplitude before applying these reference signals to the pulse width modulator.

In addition to implementing the torque control program, the digital signal processor 200 also performs various BIT operations, control functions, and diagnostic testing, as will be explained in more detail below. D/A converters 312 and 314 are provided for converting digital diagnostic test data produced by the digital signal processor 200 into analog signals during diagnostic testing of the digital signal processor 200 and the system 10 by an external testing device (not shown).

The digital gate array 300 comprises, for example, a field programmable gate array or other similar device known in the art. Generally, the digital gate array 300 receives the phase voltage signals Va, Vb, and Vc from the digital signal processor 200 and produces PWM voltage waveforms in the form of gate drive signals A1U, A1L, B1U, B1L, C1U, C1L and gate drive signals A2U, A2L, B2U, B2L, C2U, and C2L for driving the first and second power bridges 48 and 50, respectively. The digital gate array 300 also generates and transmits via an opto-isolator driver 304 various PWM signals (e.g., "Pump PWM" and "Chrgr PWM") for controlling the oil pump unit 34 and the battery charger 16, as well as various control signals (e.g., "Fan," "Main Relay," "Precharge/Discharge Relay," and "Chassis Fault Test") for controlling the radiator/fan 36, main and precharge/discharge relays (not shown) located in the input filter and DC relay control unit 44, and a chassis fault detection unit also located in the input filter and DC relay control unit 44.

Further, the digital gate array 300 receives BIT signals (e.g., "Chrgr BIT") and fault detect signals (e.g., "Chassis Fault Detect") via the opto-isolator driver 304, and receives operator initiated emergency stop signals (e.g., "Stop") via the opto-isolator 302. A more detailed description of the digital gate array 300 will now be described with reference to FIG. 10.

Figure 10:
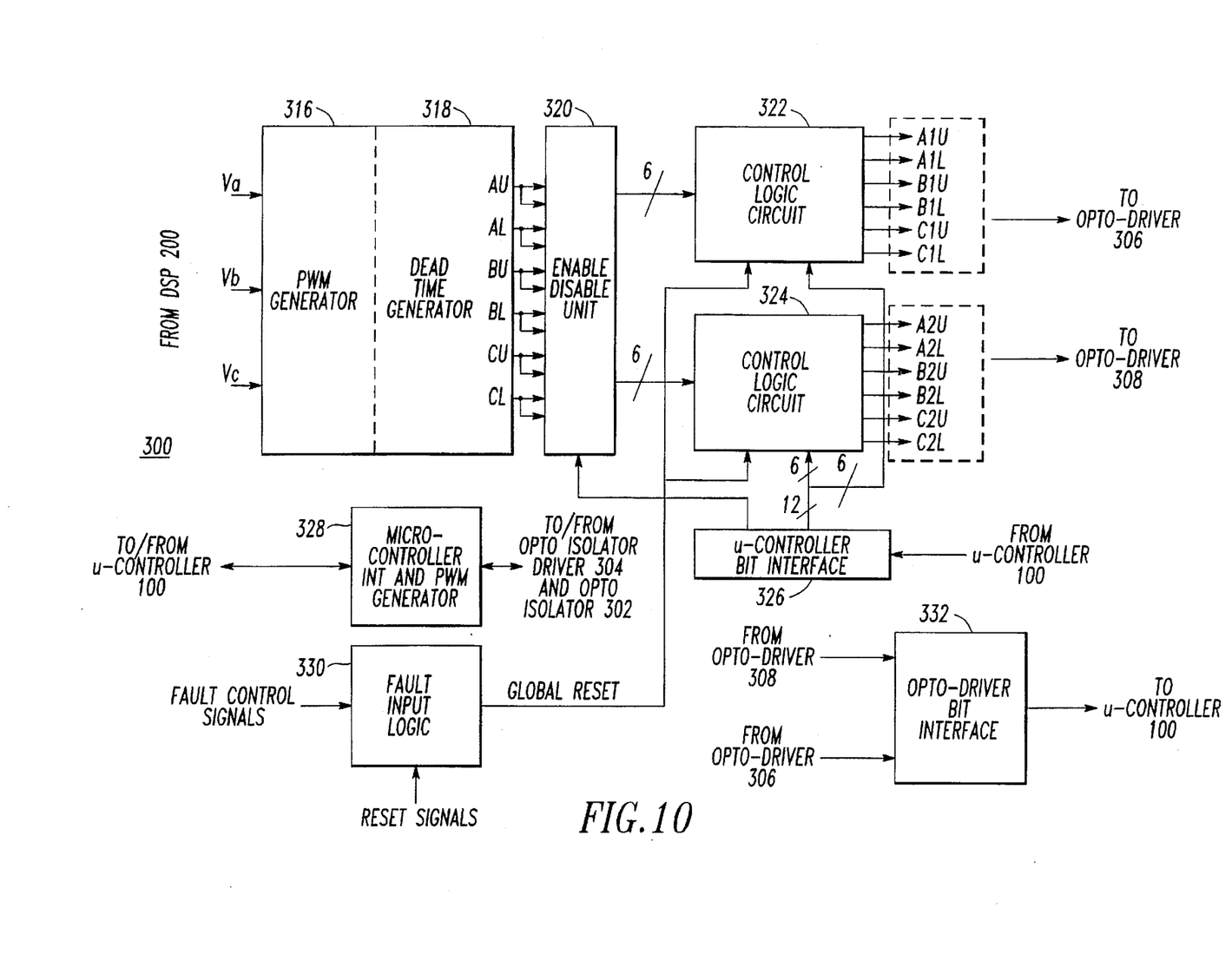
FIG. 10 is a functional diagram of the digital gate array of the vector control board of FIG. 7.

As shown in FIG. 10, the digital gate array 300 includes a PWM generator 316, a dead time generator 318, an enable/disable unit 320, control logic circuits 322 and 324, and a microcontroller BIT interface 326. As also shown in FIG. 10, the digital gate array 300 further includes a microcontroller interface and PWM generator 328, fault input logic 330, and an opto-driver BIT interface 332.

The phase voltage signals Va, Vb, and Vc from the digital signal processor 200 are received by the PWM generator 316 and the dead time generator 318. The PWM generator 316 and the dead time generator 318 produce PWM voltage signals AU, Al, BU, BL, CU, and CL from the phase voltage signals Va, Vb, and Vc.

Each of the PWM signals AU, Al, BU, BL, CU, and CL produced by the PWM generator 316 and the dead time generator 318 is split into two identical signals resulting in two sets of the PWM signals. The two sets of the PWM signals AU, Al, BU, BL, CU, and CL are applied to the enable/disable unit 320 and the control logic circuits 322 and 324, as shown in FIG. 10, to produce the gate drive signals A1U, A1L, B1U, B1L, C1U, and C1L and the gate drive signals A2U, A2L, B2U, B2L, C2U, and C2L. The gate drive signals A1U, A1L, B1U, B1L, C1U, and C1L from the control logic circuit 322 are applied to the first power bridge 48 via the opto-driver 306, while the gate drive signals A2U, A2L, B2U, B2L, C2U, and C2L from the control logic circuit 324 are applied to the second power bridge 50 via the to opto-driver 308.

The enable/disable unit 320 prevents the flow of the PWM signals AU, Al, BU, BL, CU, and CL from the dead time generator 318 to the control logic circuits 322 and 324 in accordance with BIT signals produced by the microcontroller 100. The enable/disable unit 320 receives these BIT signals from the microcontroller 100 via the microcontroller interface 326. Once the microcontroller 100 causes the enable/disable unit 320 to prevent the flow of the PWM signals AU, Al, BU, BL, CU, and CL from the dead time generator 318 to the control logic circuits 322 and 324, the microcontroller 100 can provide its own gate drive signals to the control logic circuits 322 and 324 via the microcontroller BIT interface 326. Thus, the microcontroller 100 can override control of the digital gate array 300 by the digital signal processor 200. Such overriding of control by the microcontroller 100 may be desirable, for example, should the digital signal processor 200 malfunction and during BIT of the system 10.

The microcontroller interface and PWM generator 328 includes a PWM generator and interface electronics for receiving commands from the microcontroller 100 and for producing PWM and control signals for controlling the oil pump unit 34, the battery charger 16, the radiator/fan 36, the main and precharge/discharge relays, and the chassis fault detection unit as described above. The microcontroller interface and PWM generator 328 also receives BIT and fault detect signals from the battery charger 16 and chassis fault detection unit, respectively, and operator initiated emergency stop signals and provides the received signals to the microcontroller 100.

The fault input logic 330 serves as an interface between various fault and reset circuits in the electric vehicle propulsion system 10 and the digital gate array 300. Upon receiving appropriate fault control and reset signals, the fault input logic 330 transmits a global reset to the control logic circuits 322 and 324. The fault control signals include, for example, an undervoltage signal from the low voltage power supply 42, an operator-initiated emergency shut down signal, a watchdog timer signal, a power reset signal, BIT signals from the resolver interface 400, and an overcurrent detection signal from the overcurrent detector 510. The reset signals are generated by the microcontroller 100.

The opto-driver BIT interface 332 receives BIT data from the opto-drivers 306 and 308 and provides the BIT data to the microcontroller 100 for processing. The BIT data from the opto-drivers 306 and 308 is used by the microcontroller 100 to test the gate drive signals A1U, A1L, B1U, B1L, C1U, and C1L and the gate drive signals A2U, A2L, B2U, B2L, C2U, and C2L provided by the control logic circuits 322 and 324, respectively. The BIT data from the opto-drivers 306 and 308 is used by the microcontroller 100 to test the first and second power bridges 48 and 50, respectively.

It should be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

We claim:

1. A vector control board for an electric vehicle propulsion system comprising:

a microcontroller for generating torque requests; and a digital signal processor for receiving said torque requests via a digital gate array and generating phase voltage signals, said digital gate array for receiving said phase voltage signals and for generating pulse-width modulated signals for driving a power bridge.

2. The vector control board according to claim 1, further comprising a resolver interface for receiving rotor position measurements and an analog interface for receiving current measurements, wherein the digital signal processor further receives the rotor position measurements and the current measurements and generates the phase voltage signals in accordance with the torque requests, the rotor position measurements, and the current measurements.

3. The vector control board according to claim 1, wherein the digital signal processor further performs one or more of BIT operations, control functions, and diagnostic testing for the vector control board.

4. The vector control board according to claim 1, wherein the microcontroller performs one or more of BIT operations and diagnostic testing of the vector control board.

* * * * *